US009075717B2

(12) United States Patent
Mohan, Jr. et al.

(10) Patent No.: US 9,075,717 B2
(45) Date of Patent: *Jul. 7, 2015

(54) CONNECTIVITY FAULT NOTIFICATION

(71) Applicant: RPX Clearinghouse LLC, San Francisco, CA (US)

(72) Inventors: Dinesh E. Mohan, Jr., Kanata (CA); Marc Holness, Ottawa (CA)

(73) Assignee: RPX Clearinghouse LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/502,176

(22) Filed: Sep. 30, 2014

(65) Prior Publication Data

US 2015/0019920 A1  Jan. 15, 2015

Related U.S. Application Data

(63) Continuation of application No. 11/137,015, filed on May 25, 2005, now Pat. No. 8,862,943.

(60) Provisional application No. 60/575,772, filed on May 28, 2004, provisional application No. 60/574,253, filed on May 25, 2004.

(51) Int. Cl.
*G06F 11/00* (2006.01)
*G06F 11/07* (2006.01)
(Continued)

(52) U.S. Cl.
CPC ........ *G06F 11/0772* (2013.01); *H04L 12/4641* (2013.01); *H04L 41/0631* (2013.01); *H04L 41/0663* (2013.01); *H04L 41/0677* (2013.01); *Y02B 60/43* (2013.01); *H04L 41/0686* (2013.01)

(58) Field of Classification Search
CPC ............ G06F 11/3055; G06F 11/3072; G06F 11/0766
USPC .................................................. 714/4.1, 43
See application file for complete search history.

(56) References Cited

U.S. PATENT DOCUMENTS 3,634,839 A   1/1972 Vassil et al.
4,390,869 A   6/1983 Christen et al.
(Continued)

FOREIGN PATENT DOCUMENTS

CN   1134071 A1   10/1996
JP   2000200101 A1   7/2000

OTHER PUBLICATIONS

Atsushi Iwamura Hitachi Japan: "Ethernet OAM Functions; D 402", ITU-T Draft Study Period 2001-2004, International Telecommunication Union, Geneva, Switzerland, Study Group 13, Jul. 21, 2003, pp. 1-6, XP017416575 consisting of 6-pages.
(Continued)

*Primary Examiner* — Chae Ko
(74) *Attorney, Agent, or Firm* — Christopher & Weisberg, P.A.

(57) ABSTRACT

Connectivity fault notification is provided by generating an alarm indication signal at a device that is logically adjacent to the fault, and forwarding the alarm indication signal upward through various levels to at least one client level entity. The alarm indication signal may be suppressed at any level for a service instance if service is restored at that level, or if a protection path prevents disruption of the service instance at that level, or auto-suppressed at an originating node based on number of times transmitted or elapsed time. The alarm indication signal may include a point of failure indicator such as the MAC address of the device that generates the alarm indication signal, or a failed resource identity such as an IEEE 802.1AB LLDP MAC Service Access Point ("MSAP"). Further, the alarm indication signal may be employed to trigger use of the protection path.

21 Claims, 5 Drawing Sheets

(51) Int. Cl.
*H04L 12/46* (2006.01)
*H04L 12/24* (2006.01)

(56) References Cited

U.S. PATENT DOCUMENTS

| | | | |
|---|---|---|---|
| 4,566,111 A | 1/1986 | Tanagawa | |
| 5,422,626 A | 6/1995 | Fish | |
| 5,867,481 A | 2/1999 | Miyagi | |
| 5,920,258 A | 7/1999 | Kusyk et al. | |
| 6,064,064 A | 5/2000 | Castleman | |
| 6,084,504 A | 7/2000 | Rosche et al. | |
| 6,175,927 B1 | 1/2001 | Cromer et al. | |
| 6,178,393 B1 | 1/2001 | Irvin | |
| 6,532,554 B1 | 3/2003 | Kakadia | |
| 6,581,166 B1 | 6/2003 | Hirst et al. | |
| 6,646,549 B2 | 11/2003 | Dawson | |
| 6,654,914 B1 | 11/2003 | Kaffine et al. | |
| 6,687,846 B1 | 2/2004 | Adrangi et al. | |
| 6,694,364 B1 | 2/2004 | Du et al. | |
| 7,246,159 B2 | 7/2007 | Aggarwal et al. | |
| 2001/0019536 A1 | 9/2001 | Suzuki | |
| 2002/0116669 A1 | 8/2002 | Jain | |
| 2003/0046026 A1* | 3/2003 | Levy et al. | 702/181 |
| 2003/0128148 A1 | 7/2003 | Park et al. | |
| 2004/0008988 A1 | 1/2004 | Gerstal et al. | |
| 2004/0019691 A1 | 1/2004 | Daymond et al. | |
| 2004/0088386 A1 | 5/2004 | Aggarwal | |
| 2005/0249119 A1 | 11/2005 | Elie-Dit-Cosaque et al. | |
| 2006/0123267 A1 | 6/2006 | Weeks et al. | |
| 2006/0168013 A1* | 7/2006 | Wilson et al. | 709/206 |

OTHER PUBLICATIONS

International Search Report dated Apr. 25, 2006 for International Application No. PCT/IB2005/002421, International Filing Date May 25, 2005 consisting of 4-pages.
European_First_Examination_Report dated Apr. 3, 2012 for European Regional Phase Patent No. 05767743.7; European Filing date Sep. 7, 2006 consisting of 7-pages.
English_Translation_of_3rd_Chinese_Office_Action_and_ Search_Report dated Nov. 29, 2012 for Chinese Serial No. 200580009167.3 consisting of 14-pages.
Extended_European_Search_Report dated Nov. 25, 2013 for corresponding European Divisional Application Serial No. EP 13181097.0-1862, European Regional Filing Dated—Aug. 20, 2013 consisting of 5-pages.

* cited by examiner

CONNECTIVITY FAULT NOTIFICATION

CROSS-REFERENCE TO RELATED APPLICATION

This application is a continuation of U.S. patent application Ser. No. 11/137,015, filed May 25, 2005, entitled "CONNECTIVITY FAULT NOTIFICATION", which claims priority to U.S. Provisional Application No.: 60/575,772, filed May 28, 2004, now expired, entitled "METHOD AND SYSTEM FOR CONNECTIVITY FAULT NOTIFICATION", and U.S. Provisional Application No.: 60/574,253, filed May 25, 2004, now expired, entitled "METHOD AND SYSTEM FOR CONNECTIVITY FAULT NOTIFICATION", the entirety of all of which are incorporated herein by reference.

CROSS-REFERENCE TO RELATED APPLICATIONS

A claim of priority is made to U.S. Provisional Patent Application Ser. No. 60/574,253, entitled METHOD AND SYSTEM FOR CONNECTIVITY FAULT NOTIFICATION, filed May 25, 2004, and U.S. Provisional Patent Application Ser. No. 60/575,772, entitled METHOD AND SYSTEM FOR CONNECTIVITY FAULT NOTIFICATION, filed May 28, 2004, both of which are incorporated by reference.

FIELD OF THE INVENTION

This invention is generally related to the field of network communications, and more particularly to fault notifications associated with connectivity failures.

BACKGROUND OF THE INVENTION

Ethernet and other communications protocols that were once used only in Local Area Network ("LAN") environments are now being used in Metropolitan Area Networks ("MANs") and Wide Area Networks ("WANs"). One reason for this development is that Enterprises and other customers of communications Service Providers find it convenient to operate, end-to-end, in an environment which is native to their LANs and understood by their IT professionals. However, the extension of such protocols to environments in which they were not originally intended presents some problems.

One problem is that a single failure can trigger a cascade of alarms that overwhelm an NMS/OSS. A single node or link in a WAN, for example, is likely to support many more different services than a LAN device. Each supported service may also rely on a greater number of network nodes between endpoints. If an intermediate node or link fails, an alarm is generated for each failed service. However, the other network nodes that support those services also generate alarms. Hence, in comparison to operation on a LAN, an overwhelming number of alarms can be generated as a result of a single failure.

Another problem is fault localization. In the case where communications services require use of the networks of multiple different service providers, for example, service faults may trigger provisions in Service Level Agreements ("SLAs"), which are contracts between different service providers, and also between service providers and their customers. An enterprise customer or service provider may be entitled to a credit, or invocation of a service cancellation clause, depending on the cause, frequency and duration of faults. It is therefore desirable to have technology to produce accurate, perhaps auditable, notification regarding a service fault. The notification may also include an indication of the cause of the fault and fault localization information.

SUMMARY OF THE INVENTION

In accordance with the invention, a method for providing connectivity fault notification in a network includes the steps of: detecting a connectivity fault or failure, which could include loss of continuity and misconnections, at a node logically adjacent to the failure; generating an alarm indication signal in response to detecting the connectivity fault or failure; and forwarding the alarm indication signal to at least one client level entity. In particular, the alarm indication signal is forwarded from a server layer (which has detected the fault or failure) toward the client layer, possibly through multiple intermediate levels. The alarm indication signal is periodically retransmitted until it is suppressed. For example, the alarm indication signal may be suppressed following expiration of a timer. Alternatively, the alarm indication signal may be suppressed for a client connection if a protection path prevents disruption of the client connection. It should be noted that the alarm indication signal may be suppressed at any level.

The alarm indication signal may include a point of failure indicator. For example, the alarm indication signal may include the MAC address of the device that generates the alarm indication signal, or a failed resource identity such as an IEEE 802.1AB LLDP MAC Service Access Point ("MSAP"). Hence, the client can advantageously determine the fault origin from the alarm indication signal. In the case of a service provided by multiple Service Provider networks this advantageously provides evidence of fault origin. The alarm indication signal may also be employed to trigger use of a protection path.

A network device in accordance with the invention may include circuitry operable to detect a connectivity fault or failure, which could include loss of continuity and misconnections, logically adjacent to the device; logic operable to generate an alarm indication signal in response to detection of the connectivity failure; and at least one port operable to forward the alarm indication signal to at least one client level entity. The device is operable to periodically retransmit the alarm indication signal, e.g., once per second. The device may also include a memory operable to maintain a record including bindings of Destination Addresses ("DAs"), associated ports, and an indication of client connections, e.g., Virtual LAN ("VLAN") identification associated with each DA, and Maintenance End Point ("MEP") of the client level entity. When a fault is detected the memory can be employed to determine which client connections are affected, and which ports are associated with those services. The alarm indication signal is then forwarded only via those ports associated with service instances affected by the connectivity failure. As will be discussed in greater detail below, the DA is most useful when the alarm indication signal is unicast, rather than multicast.

DETAILED DESCRIPTION

Figure 1:
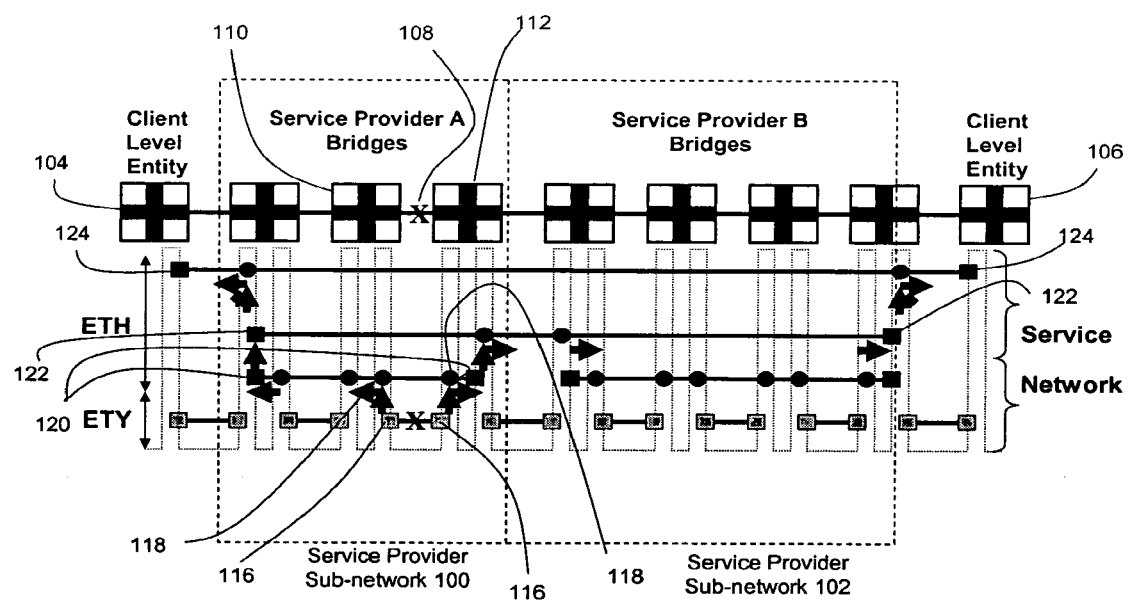
FIG. 1 illustrates a technique for delivering an indication of a network fault from a lower level to an higher level.
Figure 2:
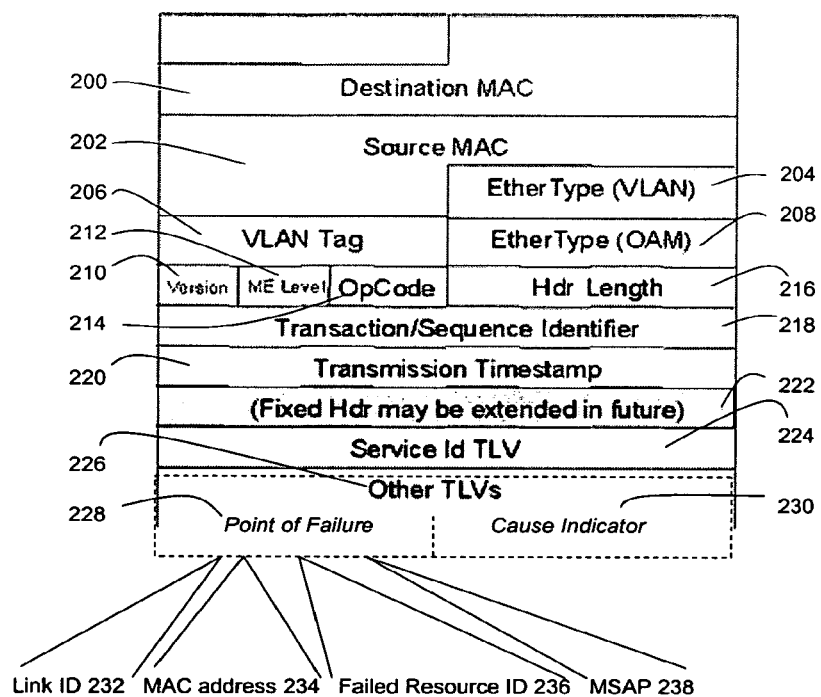
FIG. 2 illustrates a format of the AIS of FIG. 1.

FIGS. 1 and 2 illustrate a technique for delivering an indication of a network fault that affects an Ethernet-based service such as VLANs. The end-to-end network includes a first service provider sub-network (100), a second service provider sub-network (102), and client level entities (104, 106) associated with customer networks. Initially, a fault (108) is detected at the Ethernet physical layer ("ETY") by nodes such as bridges (110, 112) that are logically adjacent to the fault. The fault may be a link failure, node failure or misconnection. Further, the fault could be detected at any layer of the OSI model. In response to detection of the fault, the nodes that are logically adjacent to the failed link (108) prompt generation of an Alarm Indication Signal ("AIS") (200). In particular, Maintenance End Points ("MEPs") (116) on either side of the fault each generate an AIS (114) which is forwarded by Maintenance Intermediate Points ("MIPs") (118) at the next higher ME level towards the MEPs at the same ME level as the MIP (120) using either unicast or multicast. Upon receiving the respective AISs, each higher level MEP (120) may generate a corresponding higher level MS which is forwarded by MIPs towards MEPs (122) at the next higher level. Similarly, upon receiving the respective AISs, those MEPs (122) may generate higher level AISs which are forwarded by corresponding MIPs towards MEPs (124) associated with the client level entities (104, 106).

The alarm indication signal is periodically retransmitted until it is suppressed via one of various techniques. For example, the alarm indication signal is suppressed if the fault is repaired. A client level device assumes a fault condition has ended when X consecutive AISs are not received. Alternatively, the alarm indication signal may be auto-suppressed by the originating MEP. In particular, the originating MEP may be programmed to transmit the AIS a predetermined number of times, or for only a predetermined period of time in accordance with a countdown timer, following which the AIS is suppressed regardless of whether the fault condition remains. Alternatively, the alarm indication signal may be suppressed for a client connection if a protection path prevents disruption of the client connection. It should be noted that the alarm indication signal may be suppressed at any level. In particular, at any given level the MEP may be operable to suppress the AIS by not generating a corresponding AIS to be forwarded to the next higher level. Such an action could be taken when, for example, the connection has been restored, or does not appear to have failed, at that level. However, that receiving MEP may forward the AIS to its higher ME level upon confirming the failure on its own basis, e.g. determining failure by loss of continuity. Alarm suppression may also be associated with a particular client level entity. Further, an alarm may be suppressed by manual, administrative action.

Referring now to FIGS. 1 and 2, the MS includes a Destination MAC address field (200), a source MAC address- field (202), an EtherType (VLAN) field (204), a VLAN tag field (206), an EtherType (OAM) field (208), Version field (210), ME Level field (212), OpCode field (214), Header Length field (216), transaction/sequence identifier field (218), transmission timestamp field (220), Fixed header future extension field (222), Service ID TLV (Type Length Value) field (224), and other TLVs field (226). The transaction identifier (218) and transmission timestamp field (220) are not particularly useful for the MS, but may still be present in the generic frame format. Further, field (222) may be used to extend the fixed header in future versions of the OAM, where the version is indicated by a different version field value. The other TLVs field (226) may include a point of failure indicator TLV (228), e.g., the link ID (232) of the failed link, or an identification of which device generated the MS, in order to provide fault isolation capabilities. In particular, the AIS initiating node can insert location information such as the node's own unique MAC address TLV (234), or failed resource identity TLV (236), e.g., IEEE 802.1ab LLDP MAC Service Access Point (MSAP) (238). AIS initiating node may also insert a cause indicator TLV (230) into the AIS if the cause of the fault can be determined.

Figure 3:
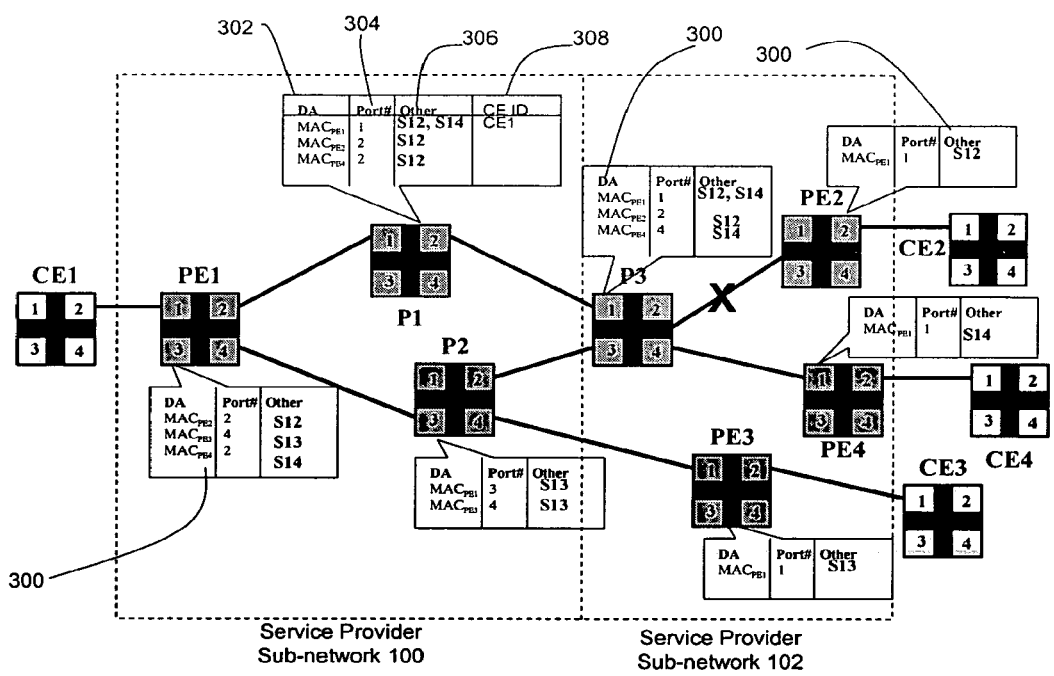
FIG. 3 illustrates the technique of FIG. 1 in the context of a network diagram.

Referring to FIG. 3, each node may maintain a record (300) in the form of a table or database to facilitate generation and selective transmission of the AIS. Each record in the table may include a Destination Address ("DA") field (302) in the form of a MAC address, a field (304) indicating of the port associated with that DA, a field (306) indicating the client entities identified by VLANs associated with that port, and a field (308) indicating associated client level MEPs. When a fault is detected it is associated with a particular port of the node. The node can then index into the table based on port number to identify the affected VLANs. Hence, the node may employ the table to identify all ports and DAs associated with the affected VLANs. The node will then transmit the MS via each port associated with each VLAN that is associated with the port via which the fault is detected. Furthermore, the node may indicate via the MS which MEPs have been isolated at the client ME level while forwarding the AIS towards the client ME level MEPs on the other side of the failure. Such transmission of the AIS in response to a fault mitigates superfluous alarm suppression at the client ME level MEPs since the MEPs are able to determine which peer MEPs have been isolated as a result of fault for which the MS is received. Such an AIS is called selective MS. Information about the client level MEPs that are associated with a MEP at the server level may be communicated via a specific OAM message that is used when MS functionality with selective alarm suppression capability is desirable. Further, the node may be configured not to maintain the records and hence may not have enough information to allow selective alarm suppression information in the transmitted MS. Such MS is called non-selective AIS. In the cases where network topology associated with the affected VLAN is known it may be possible to utilize a unicast AIS, and hence to utilize the DA. Such AIS is called as unary AIS and is directed for a specific MEP at the client ME level. Otherwise, a multicast AIS is employed for selective or non-selective purposes. In particular, a multicast AIS is sent for each affected VLAN because the AIS includes VLAN-specific fields.

In the illustrated example the network supports three different VLANs: S12, S13 and S14. VLAN S12 provides connectivity between client level entity CE1 and client level entity CE2. VLAN S13 provides connectivity between client level entity CE1 and client level entity CE3. VLAN S14 provides connectivity between client level entity CE1 and client level entity CE4. When a fault occurs in link $P3_2$-$PE2_1$, only VLAN S12 is affected because functional paths remain between client level entity CE1 and both client level entities CE4 and CE3. The fault in link $P3_2$-$PE2_1$ is initially detected on nodes PE2 and P3. Node PE2 associates the fault with its port 1, and node P3 associates the fault with its port 2. Rather than transmit a corresponding MS via all ports in response to detection of the link failure, nodes PE2 and P3 transmit the MS only via those ports associated with the affected VLAN. For example, node P3 determines from its table that a fault associated with its port 2 affects VLAN S12, and that VLAN S12 is also associated with its port 1, and hence transmits an MS via its port 1. Similarly, node PE2 determines that a fault associated with its port 1 affects VLAN S12, and that VLAN S12 is also associated with its port 2, and hence transmits an AIS via its port 2. Client level entity CE2 receives the MS from node PE2, thereby providing timely fault notification. Node P1 is operative in response to the MS received via its port 2 from node P3 to determine that VLAN S12 is affected by a fault associated with its port 2, and that VLAN S12 is also associated with its port 1. Hence, node P1 forwards the corresponding AIS via its port 1. In response to the MS from node P1, node PEI determines that VLAN S12 is affected by the fault associated with its port 2, and that its port 1 is also associated with VLAN S12. Hence, node PE1 forwards the corresponding AIS via its port 1 to client level entity CE1, thereby providing timely fault notification. Consequently, the AIS is propagated only to the client level entities CE1 and CE2 associated with VLANs affected by the fault. It will be appreciated by those skilled in the art that a single fault could affect more than one VLAN, and hence execution of the technique described above at each intermediate node may be desirable.

Figure 4:
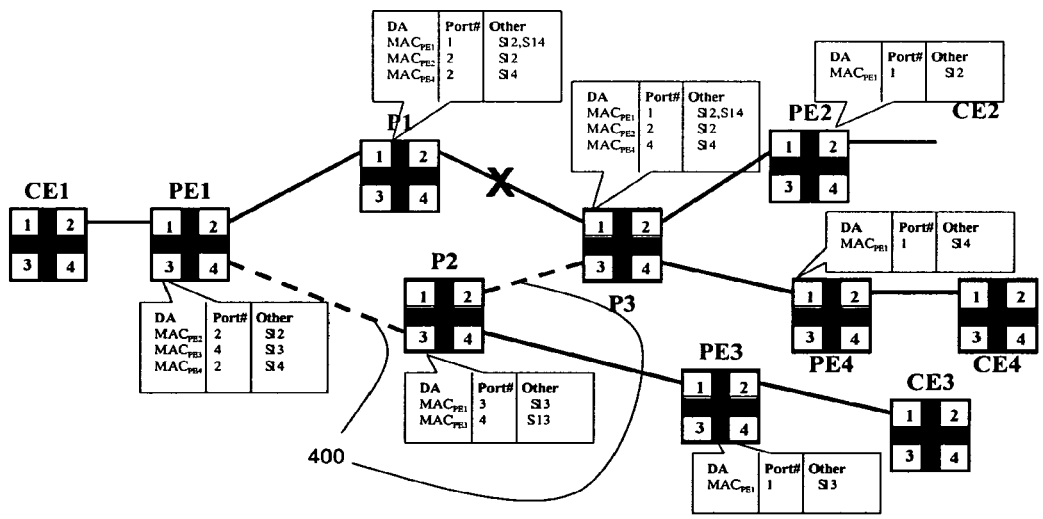
FIG. 4 illustrates alarm suppression and fault recovery.

FIG. 4 illustrates a fault scenario in which an alternate, protection path (400) is available to restore the affected VLANs in a single Service Provider network. Initially, link $P1_2$-$P3_1$ is employed to support both VLAN S12 and VLAN S14. When link $P1_2$-$P3_1$ fails both VLAN S12 and VLAN S14 are affected. However, traffic associated with VLANs S12 and S14 may be redirected along a protection path (400) from node PE1 to node P2 to node P3 in order to avoid the failed link. In the case where the protection path is implemented in a manner which avoids disruption of the affected VLANs it may be desirable to suppress the MS messages. However, if the protection path is implemented in a manner which does disrupt the VLANs then the MS messages may be forwarded to the client level entities even though the protection path eventually restores service. The network may also be implemented such that MS generation is employed to trigger implementation of a protection path. In such as case it might be worthwhile to transmit the MS for a short, predetermined period of time.

Figure 5:
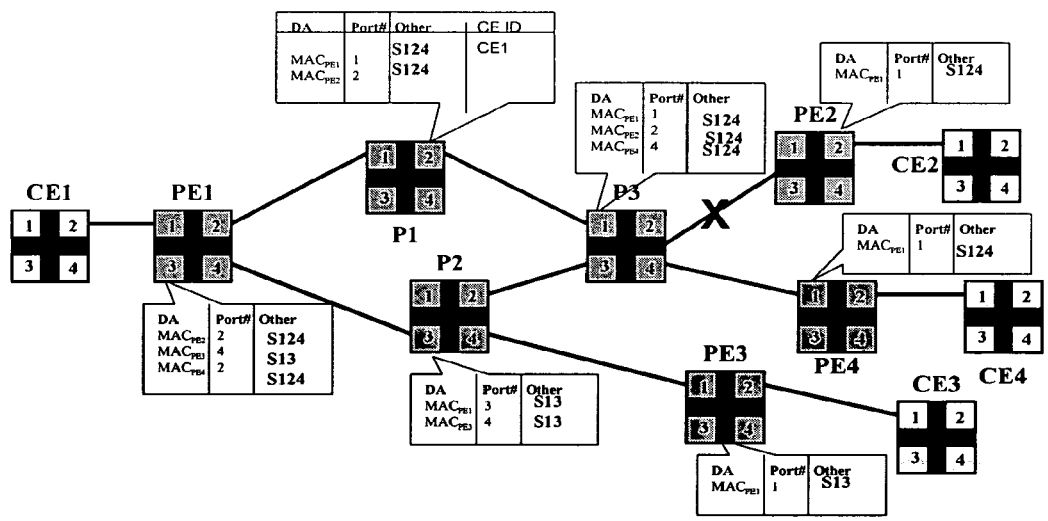
FIG. 5 illustrates selective and non-selective AIS suppression.

Referring to FIG. 5, a VLAN may be associated with more than two client level entities. For example, VLAN S124 is associated with client level entities CE1, CE2 and CE4. When link $P3_2$-$PE2_1$ fails, client level entity CE2 is isolated from client level entities CE1 and CE4. MS messages are generated in response to detection of the fault as described above. However, the alarms may be partially or entirely suppressed because the VLAN has not failed entirely. In particular, if the client level entities have insufficient information in the received MS upon which to selectively suppress the alarms, then all of the alarms are suppressed. If, however, the identification of the client level entity or entities isolated on the other side of the fault is available in the received AIS then the alarms are selectively suppressed. For example, when AIS related to link $P3_2$-$PE2_1$ failure is received at client level entity CE1 and provides information that client level entity CE2 is isolated, client level entity CE1 can suppress alarms related to client level entity CE2 however can still report alarms related to client level entity CE4.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A provider network comprising a plurality of interconnected provider network edge nodes, each edge node being configured to provide service to at least one respective client level entity, and at least one set of edge nodes being configured to provide at least one respective VLAN service to a respective set of the client level entities, each edge node of the at least one set of edge nodes being configured:
   to generate an alarm indication signal in response to detecting a fault which is logically adjacent to the edge node; and
   to forward the alarm indication signal only to client level entities associated with at least one respective VLAN service affected by the fault.

2. The provider network of claim 1, wherein the at least one set of edge nodes is configured to forward the alarm indication signal only to client level entities associated with the at least one respective VLAN service affected by the fault via a higher maintenance entity level.

3. The provider network of claim 1, wherein the at least one set of edge nodes is configured to suppress transmission of an alarm indication signal for a service instance at a level when the service instance is not disrupted at that level.

4. The provider network of claim 1, wherein the at least one set of edge nodes is configured to suppress transmission of the alarm indication signal for a service instance when the fault has been repaired.

5. The provider network of claim 1, wherein the at least one set of edge nodes is configured to suppress transmission of the alarm indication signal for a service instance in response to administrative input.

6. The provider network of claim 1, wherein the at least one set of edge nodes is configured to suppress transmission of the alarm indication signal for a service instance after a predetermined period of time.

7. The provider network of claim 1, wherein the at least one set of edge nodes is configured to suppress transmission of the alarm indication signal after periodically transmitting a predetermined number of the alarm indication signal.

8. The provider network of claim 1, wherein the at least one set of edge nodes is configured to forward the alarm indication signal only to client level entities associated with at least one respective VLAN service affected by the fault by forwarding the alarm indication signal from each edge node of the at least one set of edge nodes via each port associated with the service instance affected by the fault.

9. The provider network of claim 1, wherein the at least one set of edge nodes is configured to insert a point-of-failure indication in the alarm indication signal.

10. The provider network of claim 9, wherein the point of failure indicator indicates a media access control (MAC) address.

11. The provider network of claim 9, wherein the point of failure indicator indicates a failed resource.

12. The provider network of claim 1, wherein the at least one set of edge nodes is configured to suppress transmission of an alarm indication signal for a service instance associated with a VLAN.

13. The provider network of claim 12, wherein the at least one set of edge nodes is configured to generate a different alarm signal indication for each VLAN affected by a fault.

14. The provider network of claim 13, wherein at least one of the different alarm signal indications is a unicast alarm signal indication.

15. The provider network of claim 13, wherein at least one of the different alarm signal indications is a multicast alarm signal indication.

16. The provider network of claim 1, wherein the at least one set of edge nodes is configured to insert a cause of failure indicator in the alarm indication signal.

17. The provider network of claim 1, wherein the at least one set of edge nodes is configured to trigger use of a protection path in response to receipt of an alarm indication signal.

18. The provider network of claim 1, wherein the at least one set of edge nodes is configured, when there is insufficient information to enable selective suppression of alarm indication signals, to suppress all alarm indication signals.

19. The provider network of claim 1, wherein the at least one set of edge nodes is configured to suppress an alarm indication signal for a client entity isolated by a fault when the alarm indication signal identifies the client entity isolated by the fault.

20. The provider network of claim 1, further comprising at least one intermediate provider network node connected between at least some of the edge nodes.

21. The provider network of claim 1, wherein the provider network comprises a plurality of interconnected provider sub-networks.

* * * * *